US012674518B2

(12) United States Patent
Tanaka et al.

(10) Patent No.: US 12,674,518 B2
(45) Date of Patent: Jul. 7, 2026

(54) DISENGAGEABLE VALVE BACKSEAT SYSTEM AND METHOD

(71) Applicant: Baker Hughes Pressure Control LLC, Houston, TX (US)

(72) Inventors: Fabio Tanaka, Spring, TX (US); Lloyd Cheatham, Lake Jackson, TX (US); Javier Garcia, Tomball, TX (US)

(73) Assignee: Baker Hughes Pressure Control LLC, Houston, TX (US)

( * ) Notice: Subject to any disclaimer, the term of this patent is extended or adjusted under 35 U.S.C. 154(b) by 4 days.

(21) Appl. No.: 19/019,078

(22) Filed: Jan. 13, 2025

(65) Prior Publication Data

US 2025/0146588 A1 May 8, 2025

Related U.S. Application Data

(63) Continuation of application No. 18/340,509, filed on Jun. 23, 2023, now Pat. No. 12,196,332.

(51) Int. Cl.
  *F16K 17/38* (2006.01)
  *F16K 41/16* (2006.01)
(52) U.S. Cl.
  CPC ............ *F16K 17/383* (2013.01); *F16K 41/16* (2013.01)
(58) Field of Classification Search
  CPC ............................... F16K 17/383; F16K 41/16
  USPC ..... 137/75, 72, 73, 74, 77, 315.29; 251/193, 251/195
  See application file for complete search history.

(56) References Cited

U.S. PATENT DOCUMENTS

| | | | | |
|---|---|---|---|---|
| 3,788,600 A | | 1/1974 | Allen | |
| 3,842,853 A | * | 10/1974 | Kelly | ................... F16K 17/383 137/75 |
| 3,842,854 A | | 10/1974 | Wicke | |

(Continued)

FOREIGN PATENT DOCUMENTS

| | | |
|---|---|---|
| AU | 561984 B2 | 5/1987 |
| CN | 204062141 U | 12/2014 |

(Continued)

OTHER PUBLICATIONS

"Metal seals," Parker, accessed from: https://ceetak.com/files/downloads/parker-catalogues/metal-seal-design-guide-ptd3359en-metric.pdf, 2 pages.

(Continued)

*Primary Examiner* — Minh Q Le
(74) *Attorney, Agent, or Firm* — Hogan Lovells; Taylor Evans; Connor L. Day

(57) ABSTRACT

A valve assembly includes a valve body, a bonnet coupled to the valve body, a stem within the stem bore, a bonnet cap axially aligned with the bonnet along a stem bore axis, and a valve drive train coupled to the stem. The valve assembly also includes a first eutectic ring, positioned between a bonnet cap interior surface and an upper shelf of the valve drive train, the first eutectic ring blocking axially upward movement of the valve drive train when in a solid state, and a second eutectic ring, positioned between a lower bonnet cap interior surface and a lower shelf of the valve drive train to fill a gap, wherein the bonnet cap is configured to move in an axially downward direction after the first and second eutectic ring transition to a flowable state.

20 Claims, 6 Drawing Sheets

(56) References Cited

U.S. PATENT DOCUMENTS

| | | | | |
|---|---|---|---|---|
| 3,896,835 A | * | 7/1975 | Wicke | F16K 17/383 |
| | | | | 137/75 |
| 4,214,600 A | | 7/1980 | Williams, Jr. et al. | |
| 4,240,455 A | * | 12/1980 | McGee | F16K 17/383 |
| | | | | 74/2 |
| 4,245,661 A | | 1/1981 | McGee | |
| 4,271,857 A | * | 6/1981 | Rowe | F16K 17/383 |
| | | | | 137/75 |
| 4,289,157 A | | 9/1981 | McGee | |
| 4,307,745 A | | 12/1981 | McGee | |
| 4,379,557 A | | 4/1983 | Saka | |
| 4,393,889 A | * | 7/1983 | Binegar | F16K 3/186 |
| | | | | 137/72 |
| 4,421,134 A | | 12/1983 | Bruton et al. | |
| 4,483,545 A | | 11/1984 | Bush | |
| 4,505,291 A | | 3/1985 | Bruton | |
| 4,519,412 A | | 5/1985 | Grazioli | |
| 4,540,012 A | | 9/1985 | Bridges | |
| 4,540,013 A | | 9/1985 | Furley et al. | |
| 4,556,076 A | | 12/1985 | Bridges | |
| 4,568,062 A | | 2/1986 | Regitz et al. | |
| 4,570,659 A | | 2/1986 | Karr, Jr. | |
| 4,658,848 A | | 4/1987 | Meyer et al. | |
| 4,671,308 A | | 6/1987 | Williams et al. | |
| 4,711,262 A | | 12/1987 | Wafer et al. | |
| 4,890,635 A | | 1/1990 | Gray, Jr. | |
| 4,922,944 A | | 5/1990 | Mueller et al. | |
| 5,067,510 A | * | 11/1991 | Breaux | F16K 17/383 |
| | | | | 137/75 |
| 5,109,881 A | | 5/1992 | Baker | |
| 8,636,059 B2 | | 1/2014 | Vick, Jr. et al. | |
| 8,662,473 B2 | * | 3/2014 | Comeaux | F16K 3/0227 |
| | | | | 251/328 |
| 9,534,689 B2 | | 1/2017 | Chen | |
| 12,196,332 B1 | * | 1/2025 | Tanaka | F16K 17/383 |
| 2014/0138082 A1 | | 5/2014 | Meyberg et al. | |
| 2015/0167851 A1 | | 6/2015 | McEvoy et al. | |
| 2021/0301938 A1 | | 9/2021 | Choate et al. | |
| 2025/0189059 A1 | * | 6/2025 | Tanaka | F16K 41/043 |

FOREIGN PATENT DOCUMENTS

| | | |
|---|---|---|
| CN | 212004320 U | 11/2020 |
| CN | 215370969 U | 12/2021 |

OTHER PUBLICATIONS

"HermetiX™ Fire safe for the API industry," Habonim industrial valves and actuators, 2017, accessed from: https://habonim.com/wp-content/uploads/2017/04/catalog_hermetix_fire_safe_api_2017.pdf, 3 pages.

Michael R. Williams, "Fire-Resistant Wellhead Equipment for Offshore Platforms," Feb. 21, 1984, One Petro, SPE Offshore South East Asia Show, Singapore, 2 pages, abstract only.

Notice of Allowance issued in U.S. Appl. No. 18/340,509, dated Sep. 12, 2024.

* cited by examiner

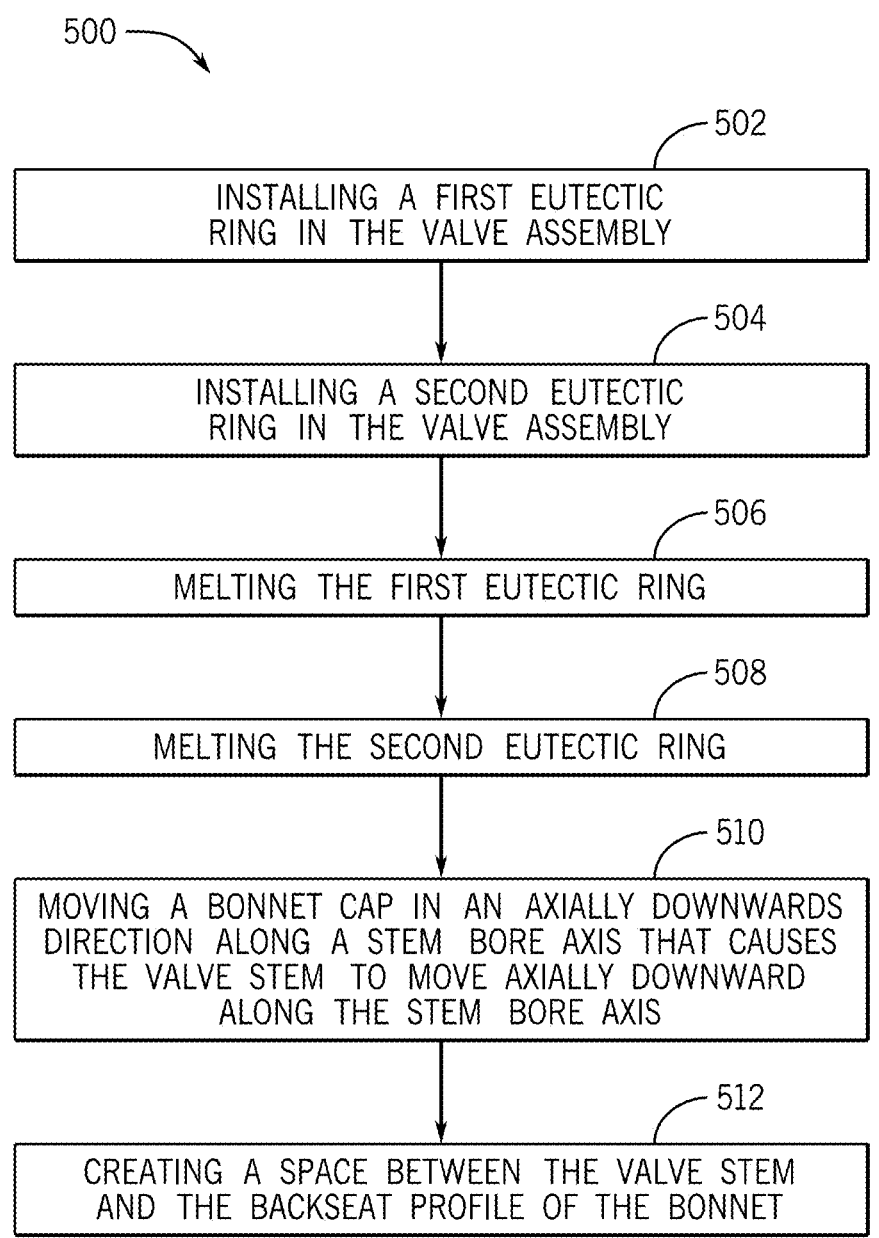

500

502
INSTALLING A FIRST EUTECTIC
RING IN THE VALVE ASSEMBLY

504
INSTALLING A SECOND EUTECTIC
RING IN THE VALVE ASSEMBLY

506
MELTING THE FIRST EUTECTIC RING

508
MELTING THE SECOND EUTECTIC RING

510
MOVING A BONNET CAP IN AN AXIALLY DOWNWARDS
DIRECTION ALONG A STEM BORE AXIS THAT CAUSES
THE VALVE STEM TO MOVE AXIALLY DOWNWARD
ALONG THE STEM BORE AXIS

512
CREATING A SPACE BETWEEN THE VALVE STEM
AND THE BACKSEAT PROFILE OF THE BONNET

FIG. 5

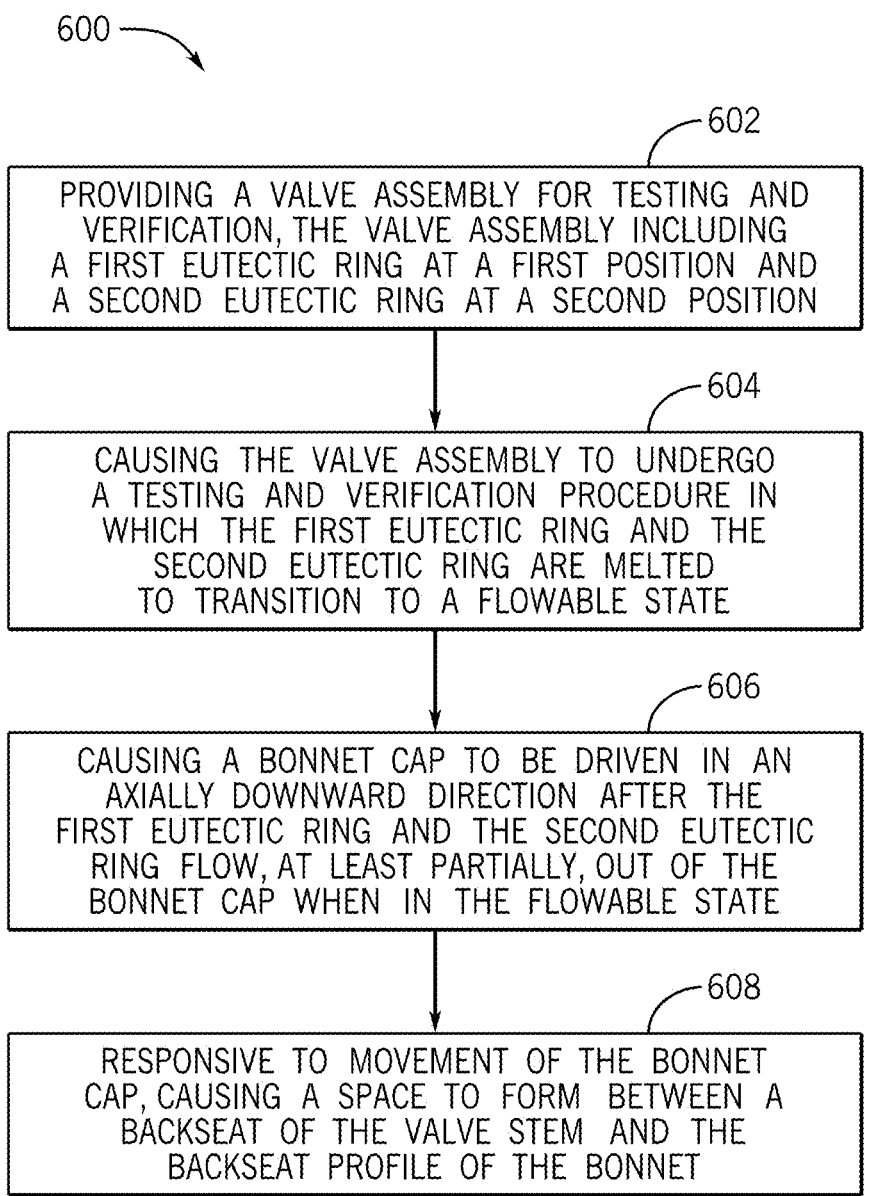

600

602

PROVIDING A VALVE ASSEMBLY FOR TESTING AND VERIFICATION, THE VALVE ASSEMBLY INCLUDING A FIRST EUTECTIC RING AT A FIRST POSITION AND A SECOND EUTECTIC RING AT A SECOND POSITION

604

CAUSING THE VALVE ASSEMBLY TO UNDERGO A TESTING AND VERIFICATION PROCEDURE IN WHICH THE FIRST EUTECTIC RING AND THE SECOND EUTECTIC RING ARE MELTED TO TRANSITION TO A FLOWABLE STATE

606

CAUSING A BONNET CAP TO BE DRIVEN IN AN AXIALLY DOWNWARD DIRECTION AFTER THE FIRST EUTECTIC RING AND THE SECOND EUTECTIC RING FLOW, AT LEAST PARTIALLY, OUT OF THE BONNET CAP WHEN IN THE FLOWABLE STATE

608

RESPONSIVE TO MOVEMENT OF THE BONNET CAP, CAUSING A SPACE TO FORM BETWEEN A BACKSEAT OF THE VALVE STEM AND THE BACKSEAT PROFILE OF THE BONNET

FIG. 6

DISENGAGEABLE VALVE BACKSEAT SYSTEM AND METHOD

CROSS-REFERENCE TO RELATED APPLICATIONS

This application is a continuation of U.S. patent application Ser. No. 18/340,509, filed Jun. 23, 2023, entitled "DISENGAGEABLE VALVE BACKSEAT SYSTEM AND METHOD," the full disclosure of which is hereby incorporated herein in its entirety for all purposes.

BACKGROUND

1. Field of Disclosure

Embodiments of the present disclosure relate to valve systems, and in particular, manual fire safe valves.

2. Description of Related Art

Valves are used in a variety of industries to regulate fluid flow. In certain industries, such as oil and gas drilling and recovery, fire safe valves may be used to ensure hazardous or flammable fluid from piping systems does not leak from the valves after exposure to fire or high temperatures. What makes a valve "fire safe" may be determined by a relevant Fire Test Specification for a particular type of valve. As various industrial applications progress, different specifications may be announced, and as a result, once qualifying valves may no longer be deemed "fire safe." For example, replacing a valve stuffing box may disqualify the "first safe" designation for the valve.

SUMMARY

Applicants recognized the problems noted above herein and conceived and developed embodiments of systems and methods, according to the present disclosure, for valve systems.

In an embodiment, a valve assembly includes a valve body having a stem bore extending along a stem bore axis and a flow bore extending along a valve body axis, the stem bore axis and the flow bore being substantially perpendicular. The valve assembly also includes a bonnet coupled to the valve body via one or more fasteners, a stem extending along the stem bore axis and within the stem bore, a bonnet cap axially aligned with the bonnet along the stem bore axis, and a valve drive train coupled to the stem and configured to drive movement of the stem between a first position and a second position. Additionally, the valve assembly includes a first eutectic ring, positioned between a bonnet cap interior surface and an upper shelf of the valve drive train, the first eutectic ring blocking axially upward movement of the valve drive train, along the stem bore axis, when in a solid state. Furthermore, the valve assembly includes a second eutectic ring, positioned between a lower bonnet cap interior surface and a lower shelf of the valve drive train to fill a gap, wherein the bonnet cap is configured to move in an axially downward direction after the first eutectic ring transitions to a flowable state from the solid state and after the second eutectic ring transitions to the flowable state from the solid state.

In another embodiment, a valve assembly includes a valve drive train, a valve stem, and a bonnet cap. The valve assembly also includes a first eutectic ring, wherein the first eutectic ring, when in a first state, blocks axially upward movement of the valve drive train along a valve stem axis, and wherein the first eutectic ring, when in a second state, enables the valve drive train to move axially upwards along the valve stem axis towards an upper bonnet cap interior surface until the valve drive train contacts the bonnet cap at the upper bonnet cap interior surface. The valve assembly further includes a second eutectic ring, wherein the second eutectic ring, when in a third state, blocks axially downward movement of the bonnet cap, the valve drive train, and the valve stem along the valve stem axis, and wherein the second eutectic ring, when in a fourth state, forms a gap between a lower bonnet cap interior surface and a lower shelf, wherein the gap allows the bonnet cap, the valve drive train, and the stem to be moved axially downwards towards the lower shelf, responsive to an applied force, until the bonnet cap contacts the lower shelf.

In an embodiment, a method for disengaging a valve stem from a backseat profile of a bonnet of a valve assembly includes providing a valve assembly for testing and verification, the valve assembly including a first eutectic ring at a first position and a second eutectic ring at a second position. The method also includes causing the valve assembly to undergo a testing and verification procedure in which the first eutectic ring and the second eutectic ring are melted to transition to a flowable state. The method further includes causing a bonnet cap to be driven in an axially downward direction after the first eutectic ring and the second eutectic ring flow, at least partially, out of the bonnet cap when in the flowable state. Responsive to movement of the bonnet cap, the method also includes causing a space to form between a backseat of the valve stem and the backseat profile of the bonnet.

BRIEF DESCRIPTION OF DRAWINGS

The present technology will be better understood on reading the following detailed description of non-limiting embodiments thereof, and on examining the accompanying drawings, in which:

FIG. 5 is a flow chart of a method for disengaging a valve stem from a backseat profile of a bonnet of a valve assembly, in accordance with embodiments of the present disclosure; and FIG. 6 is a flow chart of a method for disengaging a valve stem from a backseat profile of a bonnet of a valve assembly, in accordance with embodiments of the present disclosure.

DETAILED DESCRIPTION

Figure 1:
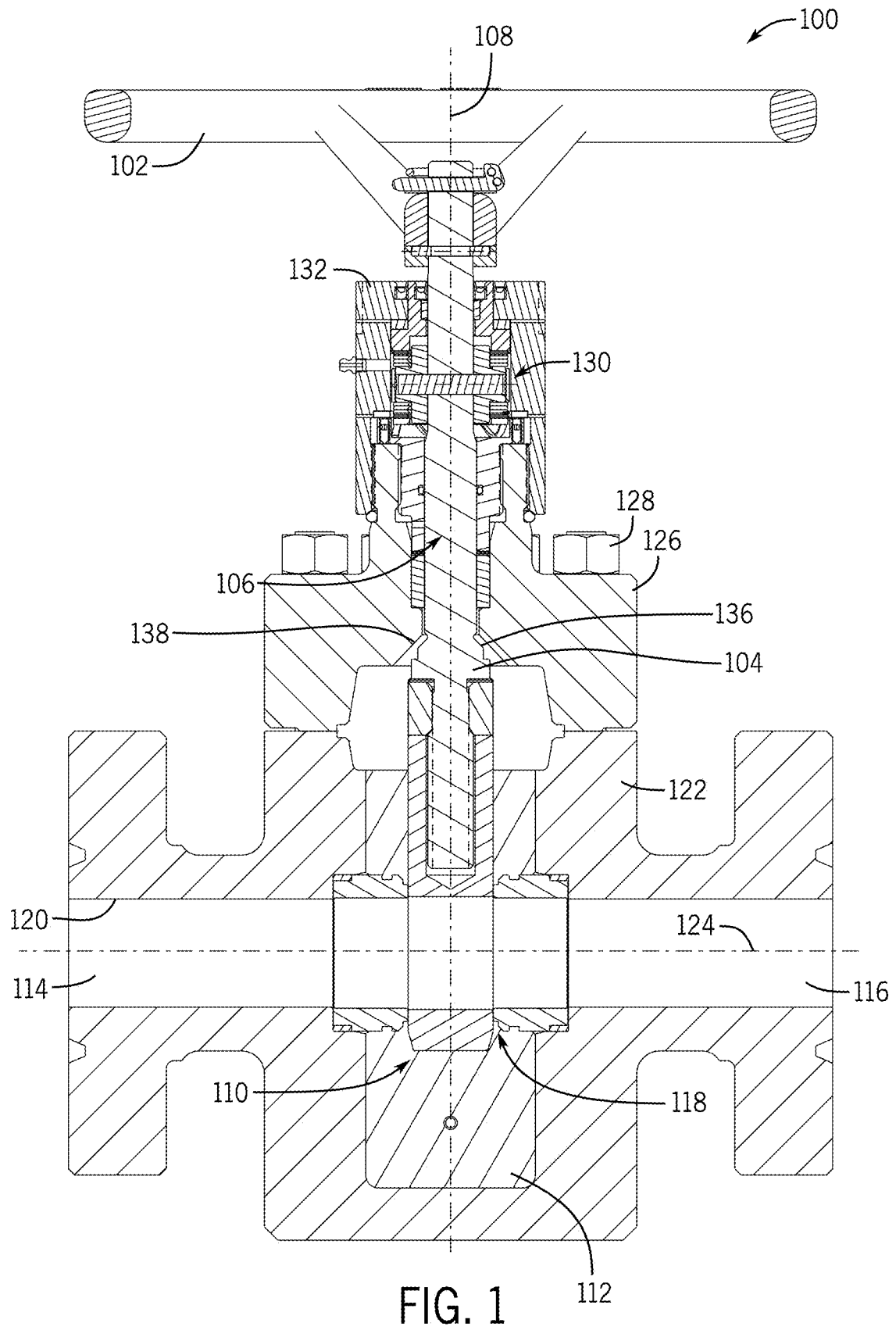
FIG. 1 is a schematic cross-sectional view of an embodiment of a valve assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure. Moreover, references to "substantially" or "approximately" or "about" may refer to differences within ranges of +/−10 percent.

Embodiments of the present disclosure are directed toward a manual fire safe valve configured to achieve a "fire safe" designation, such as by complying with one or more industry specifications for providing such a certification or designation. By way of non-limiting example, the API 6FA Fire Test Specification for Valves may be on such specification to provide this designation, but it should be appreciated that various others may also be used in a variety of different industries. Systems and methods of the present disclose may, at least in part, incorporate a eutectic ring to allow a backseat of the stem to disengage a backseat profile of a bonnet after a fire test and upon manipulation of the bonnet cap, as opposed to the stem staying in a backseat closed position. Such a configuration is designed to eliminate the galling effect at the interface of the backseat of the stem and the backseat profile of the bonnet when the valve is turned to the open position after the fire test.

Previously, many manual fire safe valves were developed aiming to validate valves per one or more specifications, such as the API 6FC Fire Test Specification for Valves with Automatic Backseats. Per API 6FC, a stuffing box (e.g., stem packing and eutectic ring) could be replaced after the fire test, prior to submitting the valve to open under differential pressure and being tested for external leakage. However, standards and specifications often change within industries, such as oil and gas exploration and production, and API 6FC was withdrawn and replaced. One replacement standards that may now be used to designate a valve as being fire safe is API 6FA Fire Test Specification for Valves, which does not allow the replacement of the stuffing box prior to submitting the valve to open under differential pressure and testing for leakage. In an attempt to comply with this new standard, various manufacturers have used elaborated drive trains for the manual valves and other alternative designs, which have had varying degrees of success, but have significantly increased costs and complexity for valves. Furthermore, the prior attempts to address the revised specification have even more limited success with certain valve configurations, such as full or partially cladded valves. For example, galling on the backseat interface area has led to various failures or even more expensive and complex drive train designs.

As one non-limiting example, fire safe valves validated per API 6FA are submitted to a flame with a temperature range of 1400° F. to 1800° F. for at least 30 minutes, while in the closed position and pressurized. During this process, seat and external leakages are monitored, with a maximum leak acceptance criteria. After 30 minutes of being subjected to a flame, the valve temperature is decreased to 212° F. or less within 30 minutes, while leakage is also monitored. After cool down, pressure is applied on the upstream side of the valve and it must open under high differential pressure until its half open position, while external leakage is monitored for 5 minutes, with a maximum acceptable leak rate.

Typically, non-rising stem valves used in oil and gas operations use elastomeric or plastomeric/thermoplastic stem seals that provide both static and dynamic sealing conditions while the valve is operated, usually by rotating the stem and/or threaded system against a drive nut located within the obturator of the valve. These valves usually have an integral shoulder (backseat) on the stem that stops on the backseat of the bonnet, allowing a metal-to-metal seal interface in case of an accident. However, while submitted to the high temperature from the flame during the fire test, the elastomeric or plastomeric/thermoplastic material of the stem seal deteriorates, causing the valve to lose its sealing capacity along the stem. Some valve models have a disk made of eutectic material that melts at high temperature (e.g., at a specified temperature that may be less than surrounding materials associated with the valve), in a location that allows the stem to move to the backseat closed position, assisted by the pressure in the valve cavity and/or a spring force. This allows the valve to be approved on the external leakage criteria during and after the fire test. However, for valves internally cladded with materials such as nickel alloy, the contact interface between the backseat of the stem against the backseat profile of the bonnet will gall while trying to rotate the stem thread to open the valve after the test, when the valve is pressurized. This galling effect will lock the stem position, not allowing the valve to be operated.

Embodiments of the present disclosure incorporate two rings made of eutectic material positioned in specific locations along the drive train of the valve allowing the valve to backseat seal while submitted to the high temperatures during the fire testing. Additionally, these embodiments incorporate a bonnet/bearing cap rotating mechanism that is activated after the tests allowing the stem to disengage the backseat interface to allow the normal operation of the valve (e.g., rotation of the stem without the aforementioned galling effect). These embodiments also incorporate a sealing element to restrict external leakage once the backseat is disengaged and the valve is returned to operation. For example, in at least one embodiment, one or more portions of a standard may evaluate leakage as the valve (e.g., the valve member) is transitioned between different positions, such as from a closed position to an open or partially opened position. By way of non-limiting example, one or more standards may evaluate leakage when the valve is transitioned to the half open position from a closed position after the fire test. In at least one embodiment, leakage may also be evaluated at other positions, such as but not limited to, movement from a half open position to a full open position, and/or other intermediate positions. In operation, a eutectic ring (e.g., a second eutectic ring) will melt during the portion of the testing in which the valve is subjected to the high temperature flame, opening a gap that enables the bonnet/bearing cap to be rotated farther down, in the direction of the bonnet. The bonnet/bearing cap transitions, which carries the drive train mechanism, including the stem, to a lower position in relation to the backseat profile of the bonnet. This movement allows the backseat of the stem to disengage the backseat profile of the bonnet, avoiding the galling effect and enabling the stem to rotate to bring the valve to the open position.

In various embodiments, methods may include disengaging a backseat interface between a backseat profile of a bonnet and a valve stem. Additionally, methods may include installing one or more eutectic rings (or another material designed to melt at a particular temperature) inside of a valve assembly to cause internal components of the valve, such as a valve stem or a drive train, to move with respect to a bonnet or valve body when the eutectic rings melt. Methods may also include manipulating a bonnet cap using a tool such as a wrench to grip flats of the bonnet cap and using torque to rotate the bonnet cap, inducing axially downward movement along a stem bore axis. Furthermore, methods may include operating a valve assembly after a fire test to avoid a galling effect between internal profiles/surfaces of the valve. In this manner, the valve assembly may be operated after a fire test through movement induced by an actuator to open a valve member to allow a fluid to flow through the bore of the valve from an inlet end to an outlet end, without the need to replace or modify internal components, such as the stem packing or drive train.

FIG. 1 is a cross-sectional side view of an embodiment of a valve assembly 100. Various components have been removed for simplicity with the present discussion, but additional components may be used with the valve assembly 100. Furthermore, while the illustrated valve assembly 100 is directed toward a gate valve, systems and methods may be used with a variety of other valve types. The illustrated valve assembly 100 includes an actuator 102. It should be appreciated that while the illustrated actuator 102 is a manual hand wheel, that automated or controlled actuators may also be utilized within the scope of the present disclosure. The illustrated actuator 102 is coupled to a valve stem 104, that extends through a stem bore 106 along a stem bore axis 108. In some embodiments, the stem bore axis 108 is aligned with a valve stem axis. In this embodiment, the valve stem 104 similarly extends through the stem bore 106 along the valve stem axis. The valve stem 104 is coupled to a valve member 110 arranged within a chamber 112. As shown, fluid (e.g., gas, liquid, solid, or a combination thereof) may enter the valve 100 through an inlet passage 114 and engage the valve member 110 en route to an outlet passage 116. The illustrated valve member 110 may seal against valve seats 118. In operation, a bore 120 extends through a valve body 122 along a valve body axis 124. The fluid is at a pressure and travels through the bore 120, for example, when the valve member 110 is positioned in an open position.

The illustrated valve assembly 100 also includes a bonnet 126 secured to the valve body 122 via one or more fasteners 128. While FIG. 1 is illustrated in cross-section, there may be several fasteners 128, which may vary in size. Surrounding the valve stem 104 and the stem bore 106, and aligned with the stem bore axis 108 of the valve assembly 100, is a drive train 130 (e.g., valve drive train). The valve drive train 130 is contained within and aligned axially with a bonnet cap 132 along the stem bore axis 108. The components of the valve drive train 130 and components within the bonnet cap 132 along the valve stem 104 are shown in more detail in FIG. 2.

Depending on the conditions of the valve or external conditions, such as temperature, a backseat 136 of the valve stem 104 may be in contact with a backseat profile 138 of the bonnet 126. In the illustrated embodiment of the valve assembly 100, the backseat 136 of the valve stem 104 is not in contact with the backseat profile 138 of the bonnet 126, which is typical of operation of the valve assembly 100 under normal conditions (e.g., pressure and temperature conditions specified by a manufacturer or applicable industry code).

Figure 2:
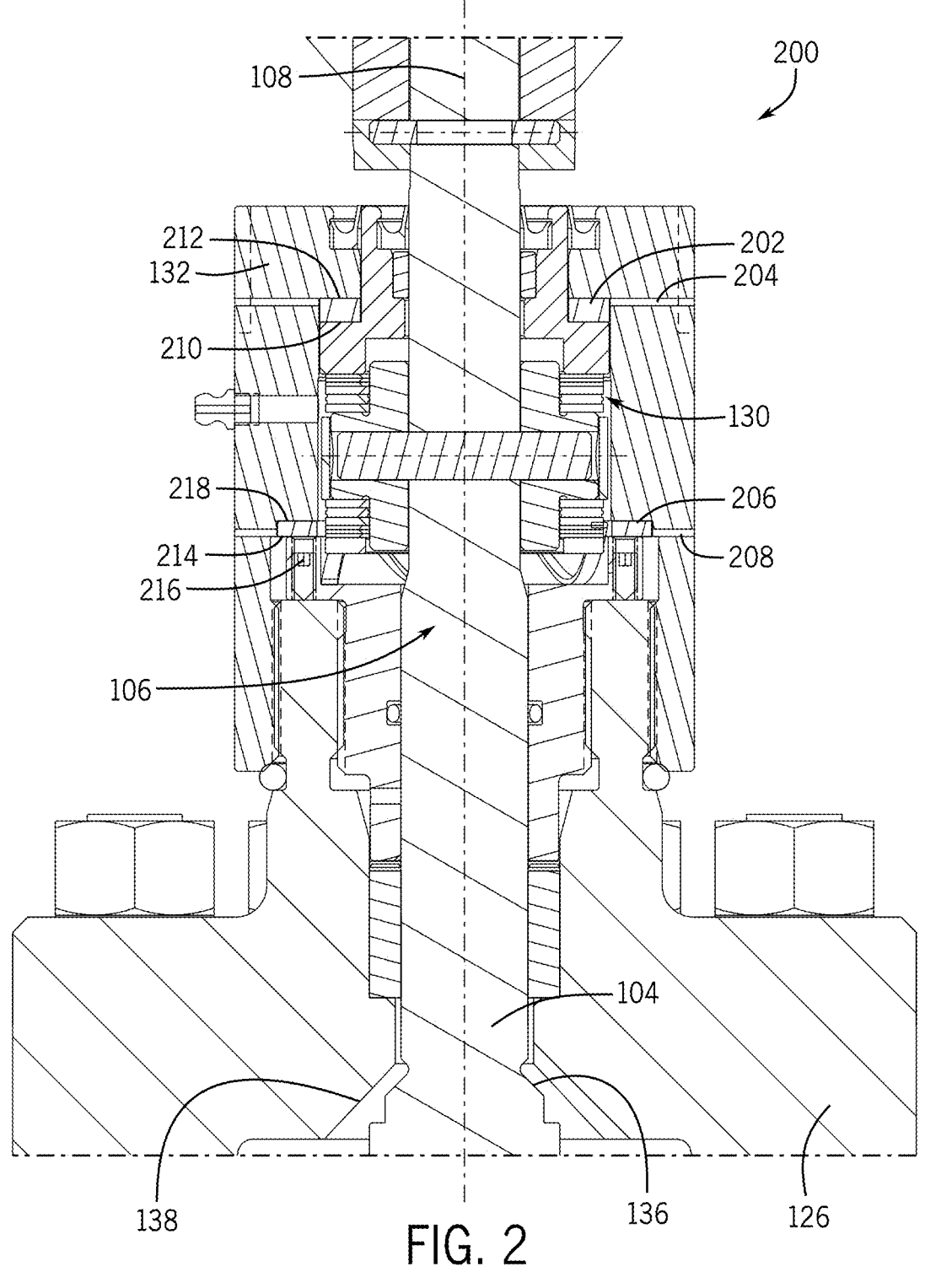
FIG. 2 is a schematic cross-sectional view of the embodiment of a valve assembly, in accordance with embodiments of the present disclosure.

FIG. 2 is an enlarged view of an embodiment of a valve assembly 200 under normal conditions, which shares several similar features with the valve assembly 100 of FIG. 1, such as the bonnet 126, stem 104, bonnet cap 132, and others, which will be identified with like reference numerals for convenience purposes only and not to limit the scope of the present disclosure.

Under normal conditions, and in the absence of high temperatures (e.g., temperatures exceeding an intended operating range of the valve, temperatures of approximately 1400° F., temperatures of approximately 1800° F., temperatures of between approximately 1400° F. and 1800° F., etc.) such as due to a fire test, a first eutectic ring 202 is located within the bonnet cap 132 and adjacent to first drain holes 204 and the valve drive train 130. In this example, the first eutectic ring 202 is radially inward with respect to an opening to the first drain holes 204, which as noted herein, may be positioned circumferentially around the bonnet cap 132 at different positions. The first eutectic ring 202 may, in certain embodiments, engage or otherwise block passage through the first drain holes 204 toward the stem bore 106. In other embodiments, the first drain holes 204 may be blocked or plugged by different components of the valve assembly 200 (e.g., the valve drive train 130, bonnet cap 132, etc.). Furthermore, in one or more embodiments, external plugs may also be fitted to the first drain holes 204 at an exterior of the bonnet cap 132 and/or one way flow controllers may be arranged within the first drain holes 204 to permit flow out of the bonnet cap 132 but to block ingress, such as from environmental conditions like moisture, dirt, dust, or debris. Additionally, a second eutectic ring 206 is located within the bonnet cap 132 and adjacent to second drain holes 208 and the valve drive train 130. In this example, the second eutectic ring 206 is radially inward with respect to an opening to the second drain holes 208, which as noted herein, may be positioned circumferentially around the bonnet cap 132 at different positions. The second eutectic ring 206 may, in certain embodiments, engage or otherwise block passage through the second drain holes 208 toward the stem bore 106. In other embodiments, the second drain holes 208 may be blocked or plugged by different components of the valve assembly 200 (e.g., the valve drive train 130, bonnet cap 132, etc.). Furthermore, in one or more embodiments, external plugs may also be fitted to the second drain holes 208 at an exterior of the bonnet cap 132 and/or one way flow controllers may be arranged within the first drain holes 204 to permit flow out of the bonnet cap 132 but to block ingress, such as from environmental conditions like moisture, dirt, dust, or debris. The first eutectic ring 202 and second eutectic ring 206 may each made up of a metal alloy of at least two metals. The metal alloy selected for the composition of the eutectic rings 202, 206 may be selected to cause the eutectic rings 202, 206 to melt at a particular melting point. In an embodiment, the melting points of the first eutectic ring 202 and the second eutectic ring 206 are substantially the same (e.g., within a threshold quantity of one another). In another embodiment, a first melting point of the first eutectic ring 202 is different from a second melting point of the second eutectic ring 206, in order to cause one eutectic ring to melt before the other during a fire test, for example.

As in FIG. 1, under normal conditions such as at a temperature below the melting points of both the first eutectic ring 202 and second eutectic ring 206, the valve assembly 200 contains the first eutectic ring 202 and second eutectic ring 206, which remain intact (and do not melt), and the valve stem 104 is not in contact with the backseat profile 138 of the bonnet 126. In one embodiment, the first eutectic ring 202 is positioned axially above (along the stem bore axis 108) the second eutectic ring 206 and farther from the bonnet 126. In other embodiments, the first eutectic ring 202 is positioned axially below (along the stem bore axis 108) the second eutectic ring 206 and closer to the bonnet 126. In another embodiment, the first eutectic ring 202 has an inner diameter that is larger than an inner diameter of the second eutectic ring 206. In other embodiments, the inner diameter of the first eutectic ring 202 is smaller than the inner diameter of the second eutectic ring 206. Similarly, depending on the embodiment, the first eutectic ring 202 may have an outer diameter that is larger or smaller than an outer diameter of the second eutectic ring 206. Different inner and outer diameters of the eutectic rings 202, 206 may result in the eutectic rings 202, 206 being positioned closer to or farther from the stem bore axis 108 within the bonnet cap 132. In some embodiments, the first eutectic ring 202 has a thickness (e.g., an axial thickness) greater than a thickness (e.g., an axial thickness) of the second eutectic ring 206. In some embodiments, the first eutectic ring 202 has a thickness less than a thickness of the second eutectic ring 206. Different thicknesses of the eutectic rings 202, 206 may cause greater or lesser movements of the internal components of the valve assembly 200 (e.g., the valve stem 104, the valve drive train 130, etc.) upon the melting of the eutectic rings 202, 206. In an embodiment, the first eutectic ring 202 is positioned on an upper shelf 210 formed by a portion of the valve drive train 130, and positioned below an upper bonnet cap interior surface 212 of the bonnet cap 132. In this embodiment, the second eutectic ring 206 is positioned on a lower shelf 214 formed by a portion of an internal fastener 216, and positioned below a lower bonnet cap interior surface 218. The internal fastener 216 may be located radially inwards from the bonnet cap 132 and radially outwards from the valve drive train 130 (in reference to the stem bore axis 108). The internal fastener 216 is also positioned axially above the bonnet 126, along the stem bore axis 108. In some embodiments, the internal fastener 216 functions to couple the valve drive train 130 to the bonnet 126. In other embodiments, there are a plurality of internal fasteners that exist within the valve assembly 200.

Figure 3:
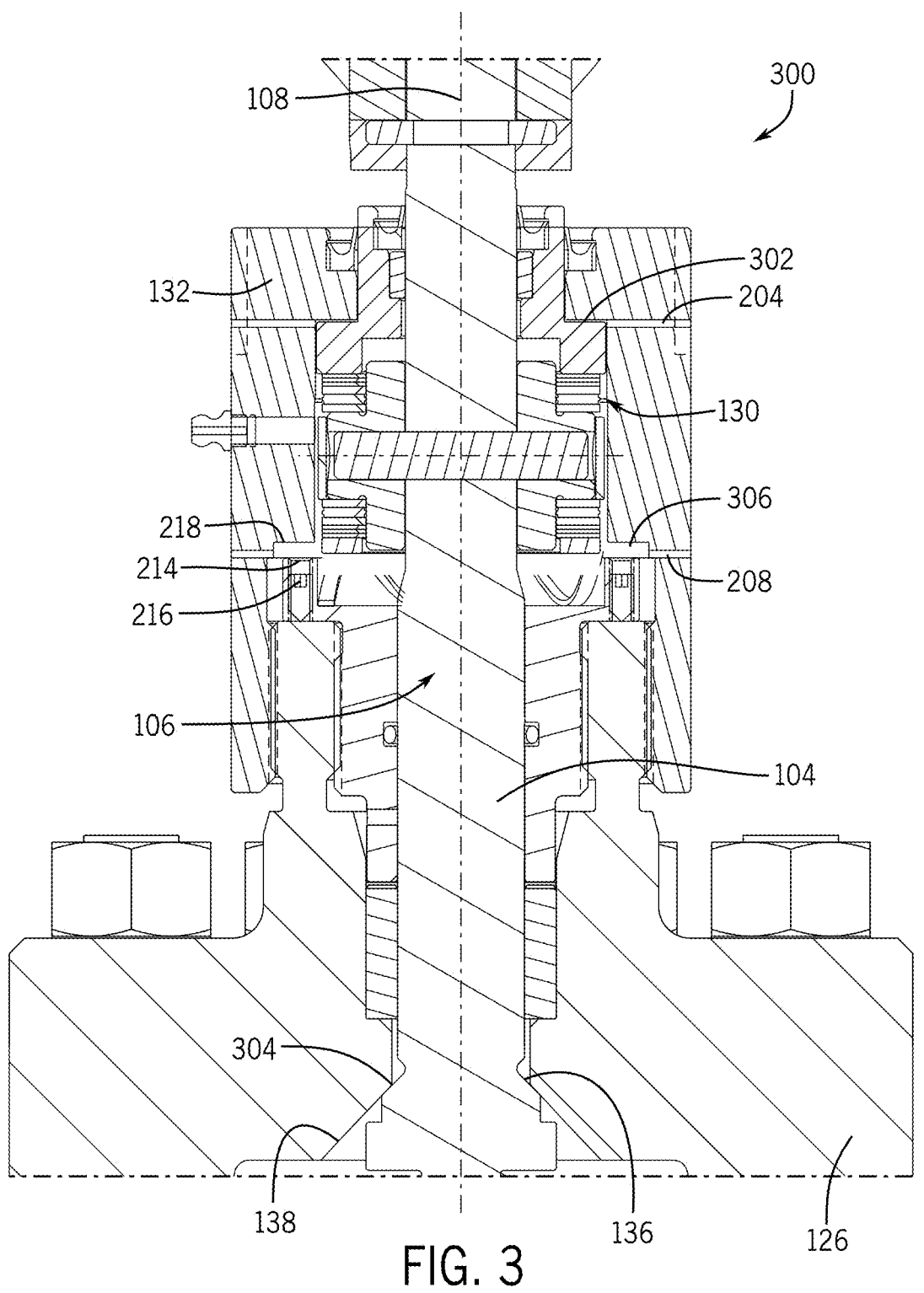
FIG. 3 is a schematic cross-sectional view of an embodiment of a valve assembly, in accordance with embodiments of the present disclosure.

FIG. 3 is an enlarged view of an embodiment of a valve assembly 300, which shares several similar features with the valve assembly 100 of FIG. 1 and the valve assembly 200 of FIG. 2, such as the bonnet 126, stem 104, bonnet cap 132, and others, which will be identified with like reference numerals for convenience purposes only and not to limit the scope of the present disclosure. In this embodiment, the valve assembly 300 has been subjected to a high temperature flame during a fire test, such as the API 6FA Fire Test Specification for Valves.

In this embodiment, the high temperature of the flame during the fire test causes the first eutectic ring 202 to melt, for example, once the temperature has reached the melting point of the first eutectic ring 202. The melted metal alloy from the first eutectic ring 202 may drain through the first drain holes 204. That is, the first eutectic ring 202 may melt to become a liquidous and/or flowable material, compared to a substantially solid/non-flowable material prior to reaching the designated melting point. In one embodiment, as the first eutectic ring 202 is melting, the valve stem 104 and the valve drive train 130 move upwards axially along the stem bore axis 108. The upward movement of these components is caused, at least in part, by the pressure in the valve cavity and/or a spring force. As the first eutectic ring 202 is melting, the valve drive train 130 (e.g., at least a portion of the valve drive train 130) moves upward axially towards the upper bonnet cap interior surface 212 until it comes in contact with the bonnet cap 132 to form an upper internal interface 302 adjacent to the first drain holes 204. In another embodiment, the upwards movement of the valve stem 104 and the valve drive train 130 occur after the first eutectic ring 202 has substantially melted. It should be appreciated that upward movement of the valve drive train 130 may also drive another insert material or spacer component upward to engage the upper internal interface 302, and as a result, systems and methods are not limited to embodiments with direct contact between the valve drive train 130 and the bonnet cap 132. The upper internal interface 302 forms once the first eutectic ring 202 is fully melted. In other words, when the first eutectic ring 202 is solid/non-flowable prior to melting, it may serve as a spacer or barrier between the bonnet cap 132 (e.g., a downward facing inner surface of the bonnet cap 132) and the valve drive train 130 (e.g., a portion of the valve drive train 130 and/or a spacer or component associated with or installed axially above the valve drive train 130). However, upon melting, a sufficient quantity of the first eutectic ring 202 may flow out of the drain holes 204 to allow engagement at the upper internal interface 302. It should be appreciated that engagement may not be direct engagement and there may be portions or a quantity of the first eutectic ring 202 remaining that has not fully flowed out of the first drain holes 204. Additionally, the valve stem 104 moves axially upwards along the stem bore axis 108 until at least a portion of the valve stem 104, such as the backseat 136 of the valve stem 104, makes contact with the backseat profile 138 of the bonnet 126 to create a backseat interface 304. In an embodiment, the backseat 136 of the valve stem 104 is an upward facing surface that is substantially perpendicular to the stem bore axis 108. In another embodiment, the backseat 136 of the valve stem 104 is an upward facing surface that is oblique to the stem bore axis 108. Certain embodiments of the backseat 136, such as the angle of its upward facing surface, may be selected in order to align evenly with the backseat profile 138 of the bonnet 126 to create the backseat interface 304. As an example, the backseat profile 138 of the bonnet 126 may be substantially parallel to the backseat 136 of the valve stem 104 to create an effective metal to metal seal at the backseat interface 304. In an embodiment, the backseat interface 304 functions as a metal to metal seal to prevent leakage of the fluid from the valve chamber.

In some embodiments, a temperature is reached that causes the second eutectic ring 206 to melt, due to the temperature being above the melting point of the metal alloy of the second eutectic ring 206. In this embodiment, the melted metal alloy from the second eutectic ring 206 drains through the second drain holes 208. As noted herein, the second eutectic ring 206, like the first eutectic ring 202, may melt to become a liquidous and/or flowable material, compared to a substantially solid/non-flowable material prior to reaching the designated melting point. When the second eutectic ring 206 melts, a gap 306 forms in its absence, between the lower bonnet cap interior surface 218 of the bonnet cap 132 and the lower shelf 214 formed by a portion of the internal fastener 216. The gap 306 provides the room for the bonnet cap 132 and the valve drive train 130 to be shifted downward axially along the stem bore axis 108. It should be appreciated that the size of the second eutectic ring 206 that is installed within the valve assembly 300 may be correlated to the size of the gap 306 that forms in its absence, when the second eutectic ring 206 melts.

In some embodiments, including certain prior art embodiments and embodiments in which the bonnet cap 132 has not yet been moved, after being subjected to the high temperature flame during a fire test, the valve assembly 300 is manipulated through movement induced by the actuator 102 to rotate the valve stem 104 within the stem bore 106 about the stem bore axis 108. Since the valve stem 104 is in contact with the backseat profile 138 of the bonnet 126 at the backseat interface 304, a galling effect may affect the backseat interface 304, which is undesirable for valve functionality. The galling effect may be caused by friction and/or abrasion between the backseat profile 138 of the bonnet 126 and the valve stem 104 at the backseat interface 304, sometimes due to the certain metal or other material these components are made of. This galling effect may cause the valve assembly 300 to not be fully operational. In other words, attempts to open the valve assembly 300 after a fire test may be unsuccessful.

Figure 4:
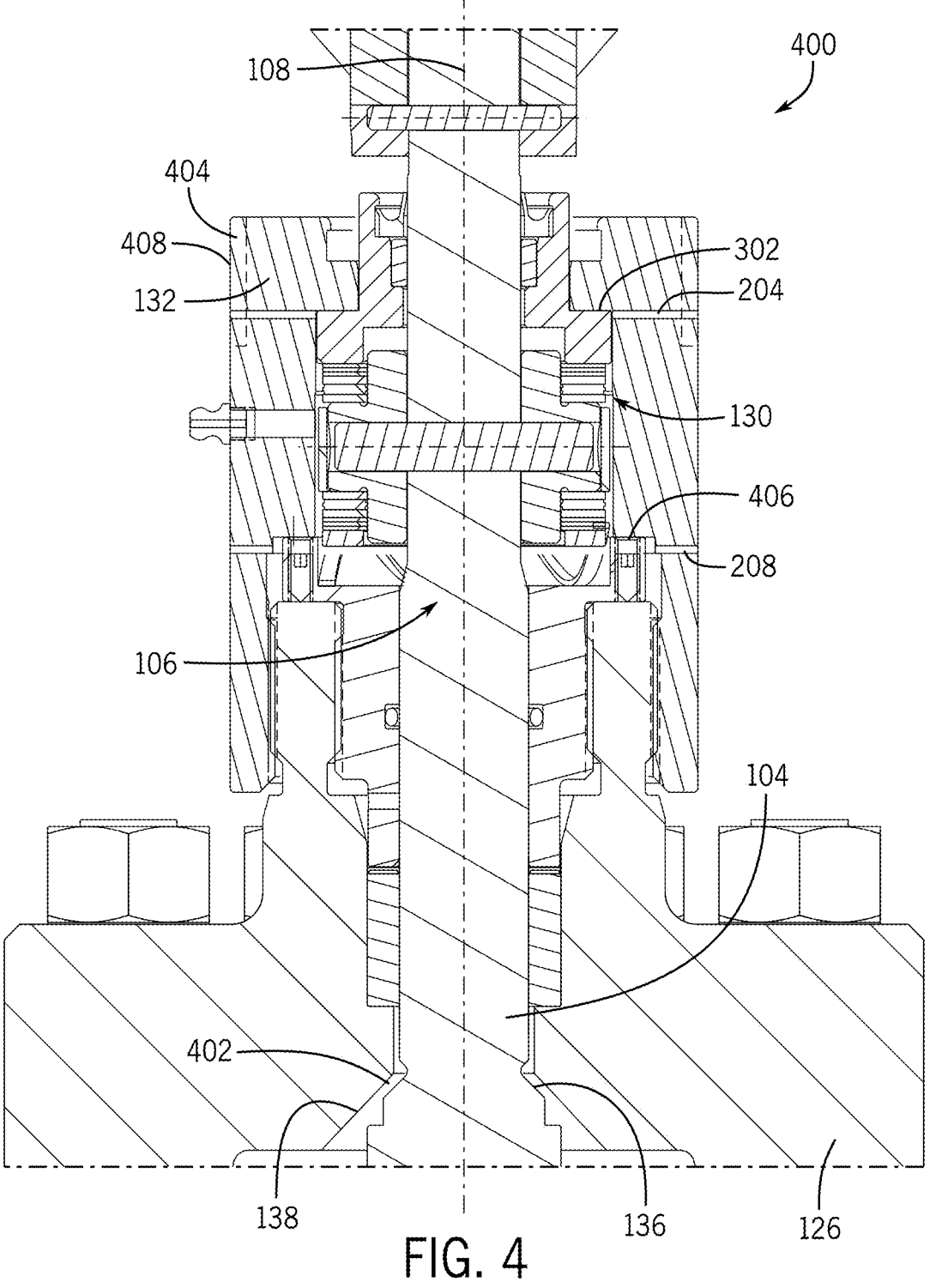
FIG. 4 is a schematic cross-sectional view of an embodiment of a valve assembly, in accordance with embodiments of the present disclosure.

FIG. 4 is an enlarged view of an embodiment of a valve assembly 400, which shares several similar features with the valve assembly 100 of FIG. 1, valve assembly 200 of FIG. 2, and valve assembly 300 of FIG. 3, such as the bonnet 126, stem 104, bonnet cap 132, and others, which will be identified with like reference numerals for convenience purposes only and not to limit the scope of the present disclosure. In this embodiment, the valve assembly 400 has been subjected to a high temperature flame during a fire test, such as the API 6FA Fire Test Specification for Valves, and the backseat interface 304 has been disengaged. This embodiment of the valve assembly 400, through the disengagement of the backseat interface 304, avoids the galling effects experienced by other valve configurations, such as the valve assembly 300 of FIG. 3.

In some embodiments, a temperature is reached that causes the first eutectic ring 202 and the second eutectic ring 206 to melt, due to the temperature being above the melting point of the metal alloys of the two eutectic rings. In this embodiment, the melted metal alloy from the first eutectic ring 202 drains through the first drain holes 204 and the melted metal alloy from the second eutectic ring 206 drains through the second drain holes 208. It should be appreciated that the first eutectic ring 202 and the second eutectic ring 206 are not depicted in FIG. 4, since FIG. 4 is an embodiment where the first eutectic ring 202 and the second eutectic ring 206 have been melted and have drained out of the valve assembly 400 through the first drain holes 204 and second drain holes 208, respectively. As noted, residual quantities or portions of one or both of the first eutectic ring 202 and the second eutectic ring 206 may remain in various embodiments.

After a fire test, to disengage the backseat profile 138 of the bonnet 126 from the valve stem 104, the bonnet cap 132 is moved downward axially along the stem bore axis 108, which also moves the valve stem 104 and valve drive train 130 downward axially along the stem bore axis 108. During the disengagement process, these components are shifted downward axially, which creates a space 402 between the backseat profile 138 of the bonnet 126 and the valve stem 104. In some embodiments, the components are shifted axially downward by clamping a wrench or other tool onto flats 404 to rotate the bonnet cap 132, which moves the bonnet cap 132 downwards axially along the stem bore axis 108. In an embodiment, the flats 404 may be positioned on an outer surface 408 of the bonnet cap 132. Additionally, the downward movement of the bonnet cap 132 that moves the valve drive train 130 downward causes the bonnet cap 132 to make contact with the valve drive train 130 to form a lower internal interface 406 adjacent to the second drain holes 208. The lower internal interface 406 forms once the second eutectic ring 206 is fully melted and after the bonnet cap 132 is moved downwards axially during the disengagement process.

In this embodiment, unlike the embodiment depicted in FIG. 3, there is no backseat interface 304 between the backseat profile 138 of the bonnet 126 and the valve stem 104. Because there is no backseat interface 304, and instead there is the space 402 between the backseat profile 138 of the bonnet 126 and the valve stem 104, when the valve stem 104 is rotated within the stem bore 106 around the stem bore axis 108 through movement induced by the actuator 102, there is no or substantially no galling effect between the components. This embodiment allows free rotation of the valve stem 104, allowing the valve assembly 400 to be able to be opened after a fire test, resulting in an operational valve with proper fluid flow through the bore 120.

FIG. 5 is a flow chart of a method 500 for disengaging a valve stem from a backseat profile of a bonnet of a valve assembly. It should be appreciated that steps for the method may be performed in any order, or in parallel, unless otherwise specifically stated. Moreover, the method may include more or fewer steps. In this example, a first eutectic ring is installed in the valve assembly 502. Additionally, a second eutectic ring may be installed in the valve assembly 504. The method also includes melting the first eutectic ring 506. The method also includes melting the second eutectic ring 508. As an example, the melting of the first eutectic ring and/or the melting of the second eutectic ring may occur as a result of validating the valve assembly per API 6FA. The melting of the second eutectic ring may also create a gap between the bonnet cap and a valve drive train. Furthermore, the bonnet cap may be moved in an axially downward direction along a stem bore axis that causes the valve stem to move axially downward along the stem bore axis 510. For example, the bonnet cap may be manipulated by using a wrench or other tool to grip flats of the bonnet cap. Manipulating the bonnet cap may also cause an axially downward movement of a valve drive train along the stem bore axis. As an example, an upper internal interface may form between the bonnet cap and the valve drive train. As a further example, a lower internal interface may form between the bonnet cap and the valve drive train. The method disclosed herein may also include creating a space between the valve stem and the backseat profile of the bonnet 512.

FIG. 6 is a flow chart of a method 600 for disengaging a valve stem from a backseat profile of a bonnet of a valve assembly. It should be appreciated that steps for the method may be performed in any order, or in parallel, unless otherwise specifically stated. Moreover, the method may include more or fewer steps. In this example, a valve assembly is provided for testing and verification where the valve assembly includes a first eutectic ring at a first position and a second eutectic ring at a second position 602. In an embodiment, the first position of the first eutectic ring is axially above the second position of the second eutectic ring along a stem bore axis. The method may also include causing the valve assembly to undergo a testing and verification procedure in which the first eutectic ring the second eutectic ring are melted to transition to a flowable state 604. As an example, the testing and verification procedure may be in accordance with the API 6FA Fire Test Specification for Valves. In an embodiment, causing the valve assembly to undergo a testing and verification procedure in which the first eutectic ring and the second eutectic ring are melted to transition to a flowable state creates a gap between a lower bonnet cap interior surface of the bonnet cap and a lower shelf formed by a portion of an internal fastener. Additionally, the method includes causing a bonnet cap to be driven in an axially downward direction after the first eutectic ring and the second eutectic ring flow, at least partially, out of the bonnet cap when in the flowable state 606. In an embodiment, causing a bonnet cap to be driven in an axially downward direction also causes a valve drive train to be driven in an axially downward direction. Furthermore, the method includes causing a space to form between a backseat of the valve stem and the backseat profile of the bonnet, in response to movement of the bonnet cap 608.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly, comprising:
   a valve body having a stem bore extending along a stem bore axis and a flow bore extending along a valve body axis;
   a bonnet coupled to the valve body;
   a stem extending along the stem bore axis and within the stem bore;
   a bonnet cap axially aligned with the bonnet along the stem bore axis;
   a first eutectic ring;
   a second eutectic ring; and
   wherein the bonnet cap is configured to move in a direction after the first eutectic ring transitions to a flowable state from a solid state and after the second eutectic ring transitions to the flowable state from the solid state.

2. The valve assembly of claim 1, further comprising:
   first drain holes adjacent to the first eutectic ring, wherein the first eutectic ring flows through the first drain holes in the flowable state; and
   second drain holes adjacent to the second eutectic ring, wherein the second eutectic ring flows through the second drain holes in the flowable state.

3. The valve assembly of claim 1, wherein the first eutectic ring has a first melting point substantially similar to a second melting point of the second eutectic ring.

4. The valve assembly of claim 1, wherein the first eutectic ring has a first melting point substantially different from a second melting point of the second eutectic ring.

5. The valve assembly of claim 1, further comprising:
   an actuator coupled to the stem.

6. The valve assembly of claim 1, wherein a space is created between a backseat profile of the bonnet and the stem when the bonnet cap is moved in the direction.

7. The valve assembly of claim 1, wherein a gap is closed when the bonnet cap is moved in the direction.

8. The valve assembly of claim 1, wherein a first inner diameter of the first eutectic ring is smaller than a second inner diameter of the second eutectic ring.

9. The valve assembly of claim 1, wherein a first axial thickness of the first eutectic ring is greater than a second axial thickness of the second eutectic ring.

10. The valve assembly of claim 1, wherein the bonnet cap is configured to move in the direction by using a tool to grip flats on an outer surface of the bonnet cap.

11. A valve assembly, comprising:
    a valve drive train;
    a valve stem;
    a bonnet cap;
    a first eutectic ring, wherein the first eutectic ring, when in a first state, blocks movement of the valve drive train, and wherein the first eutectic ring, when in a second state, enables the valve drive train to move; and
    a second eutectic ring, wherein the second eutectic ring, when in a third state, blocks movement of the bonnet cap, the valve drive train, or the valve stem, and wherein the second eutectic ring, when in a fourth state, enables the bonnet cap, the valve drive train, or the valve stem to move.

12. The valve assembly of claim 11, further comprising:
    first drain holes.

13. The valve assembly of claim 11, further comprising:
    second drain holes.

14. The valve assembly of claim 12, wherein the first eutectic ring, when in the second state, flows out of the valve assembly via the first drain holes.

15. The valve assembly of claim 13, wherein the second eutectic ring, when in the fourth state, flows out of the valve assembly via the second drain holes.

16. A method for disengaging a valve stem from a backseat profile of a bonnet of a valve assembly, comprising:
    providing a valve assembly, the valve assembly including a first eutectic ring at a first position and a second eutectic ring at a second position;
    melting the first eutectic ring and the second eutectic ring to a flowable state; and
    causing a bonnet cap to be driven in a direction after the first eutectic ring and the second eutectic ring flow, at least partially, out of the bonnet cap when in the flowable state.

17. The method of claim 16, wherein providing the valve assembly is for a testing and verification procedure.

18. The method of claim 16, wherein causing the bonnet cap to be driven in the direction also causes a valve drive train to be driven in the direction.

19. The method of claim 16, wherein the melting creates a gap between a lower bonnet cap interior surface of the bonnet cap and a lower shelf.

20. The method of claim 16, wherein the first position of the first eutectic ring is axially above the second position of the second eutectic ring along a stem bore axis.

* * * * *